(12) United States Patent
Lee et al.

(10) Patent No.: US 8,683,607 B2
(45) Date of Patent: Mar. 25, 2014

(54) METHOD OF WEB SERVICE AND ITS APPARATUS

(75) Inventors: Jae Seung Lee, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 521 days.

(21) Appl. No.: 12/808,456

(22) PCT Filed: Dec. 5, 2008

(86) PCT No.: PCT/KR2008/007206
§ 371 (c)(1),
(2), (4) Date: Jun. 16, 2010

(87) PCT Pub. No.: WO2009/078609
PCT Pub. Date: Jun. 25, 2009

(65) Prior Publication Data
US 2010/0269149 A1    Oct. 21, 2010

(30) Foreign Application Priority Data
Dec. 18, 2007    (KR) .......................... 10 2007 0133783

(51) Int. Cl.
*H04L 29/06*    (2006.01)
(52) U.S. Cl.
USPC ............. 726/27; 726/1; 726/2; 726/3; 726/26
(58) Field of Classification Search
USPC ......................................... 726/1–3, 22, 26–30
See application file for complete search history.

(56) References Cited

U.S. PATENT DOCUMENTS

| | | | |
|---|---|---|---|
| 6,606,659 B1 * | 8/2003 | Hegli et al. ................... 709/225 |
| 7,788,711 B1 * | 8/2010 | Sun et al. ........................... 726/8 |
| 2004/0139319 A1 | 7/2004 | Favazza et al. |
| 2005/0081055 A1 * | 4/2005 | Patrick et al. ................. 713/200 |
| 2005/0097060 A1 | 5/2005 | Lee et al. |
| 2005/0277420 A1 * | 12/2005 | Shin et al. ...................... 455/442 |
| 2006/0136990 A1 * | 6/2006 | Hinton et al. ..................... 726/2 |
| 2006/0183463 A1 | 8/2006 | Falk et al. |
| 2007/0136809 A1 | 6/2007 | Kim et al. |
| 2007/0150934 A1 * | 6/2007 | Fiszman et al. ................... 726/1 |
| 2008/0172721 A1 * | 7/2008 | Noh et al. .......................... 726/4 |
| 2008/0282338 A1 * | 11/2008 | Beer ............................... 726/12 |

FOREIGN PATENT DOCUMENTS

| KR | 10-2006-0076804 A | 7/2006 |
| KR | 1020070072835 A | 7/2007 |
| KR | 1020070077517 A | 7/2007 |

OTHER PUBLICATIONS

Thomas Grob, Security Analysis of the SAML Single Sign-on Browser/Artifact Profile, 2003, retrieved from https://www.acsac.org/2003/papers/73.pdf, pp. 1-11.*

(Continued)

*Primary Examiner* — Chau Le

(57) ABSTRACT

The present invention relates to a web service method and an apparatus therefor. A service apparatus in accordance with the present invention includes a message security gateway for security, an authentication server, an authorization server, a security policy server, a harmful site database, and an application server. User authentication employs SAML assertion of an SAML authority server. A service method in accordance with the present invention analyzes a message format and can employ security technologies although they have different message formats.

16 Claims, 6 Drawing Sheets

(56) References Cited

OTHER PUBLICATIONS

Oasis, Technical Overview of the Oasis Security Assertion Markup Language (SAML) V1.1, May 2004, Retrieved from https://www.oasis-open.org/committees/download.php/6837/, pp. 1-19.*

Oasis, Security Assertion Markup Language (SAML) V2.0 Technical Overview, Mar. 2, 2008, Retrieved from https://www.oasis-open.org/committees/download.php/27819/, pp. 1-51.*

International Search Report for PCT/KR2008/007206 filed on Dec. 5, 2008.

* cited by examiner

METHOD OF WEB SERVICE AND ITS APPARATUS

TECHNICAL FIELD

The present invention relates to a web service method and an apparatus therefor, and more specifically to a web service method, which provides secure security and Mashup services in a web 2.0 environment, and an apparatus therefor.

The present invention was supported by the IT R&D program of Ministry of Information and Communication (MIC) and Institute for Information Technology Advancement (IITA) [Project No.: 2007-P10-17, Project Title: Development of Ubiquitous Web Services Standards].

BACKGROUND ART

Web 2.0 technology aiming at the web as a platform has become popularized abruptly. In line with this trend, static webs based on an existing client-server model have changed. Web 2.0 has realized the advantages, such as improved user access, easy services by users, and shared resources through the utilization of Asynchronous JavaScript and XML (AJAX), OpenAPI, Mashup, etc., but has more severe security vulnerability than an existing web service. Web 2.0 includes all security problems of the existing web service and is more likely to be attacked than existing web applications because of the operating method of web 2.0, including additionally various clients, a variety of access methods and bidirectionality, and asynchronous property.

The most severe problem of the security problems of web 2.0 is a security problem of Mashup. In Mashup applications, a variety of third-party resources in different domains are combined and used as service constituent elements and, if any one of the third-party resources is harmful, a detrimental security problem occurs over the entire Mashup service. A technology that has been most widely used for Mashup is AJAX. AJAX uses XML, Java Script, and so on and therefore has many related security vulnerability. As known attack methods, there are XML-DoS, XML message injection and manipulation, session hijacking and theft, and the like. In order to prevent them, not only authentication, confidentiality, integrity, and non-repudiation of messages, but also message contents-based harmful message filtering is necessary. Web-related attack traffic uses the port No. 80. Such attack is not prevented by an existing firewall because the existing firewall opens the port No. 80. Accordingly, a message has to be filtered by analyzing the contents of the message. Further, since various resources between different domains are frequently combined, an application of single sign-on (SSO) technology to users of these resources to be urgently necessary. It is also necessary to be able to prevent access from known harmful sites and service request to harmful sites.

A technology that has been most widely used for Mashup is AJAX. AJAX uses messages of not only in XML form, but also in JavaScript Object Notation (JSON) and plain text form for the purpose of message exchange. Accordingly, there is a need for a security technology which can be applied for all of these messages.

DISCLOSURE OF INVENTION

Technical Problem

An object of the present invention is to provide a web service method, which provides secure web services irrespective of the format of a web service request message in web environments and provides single sign-on in Mashup services using services between different domains, and an apparatus therefor.

Technical Solution

In order to accomplish the above object, a web service method in accordance with the present invention includes the steps of receiving a web service request message, determining whether Security Assertion Markup Language (SAML) assertion is included in the received message, if, as a result of the determination, the SAML assertion is not included in the received message, receiving SAML assertion from a SAML authority server and performing user authentication using the SAML assertion, if, as a result of the determination, the SAML assertion is included in the receive message, performing user authentication using the SAML assertion, and after the authentication is completed, performing a web service according to the receive message.

Meanwhile, a web service apparatus in accordance with the present invention includes a harmful site database for storing information about known harmful sites, a message security gateway for rejecting reception of a web service request message from any one of the harmful sites and precluding transmission of a web service request transmit message to any one of the harmful sites, analyzing the request message, rejecting reception of the request message when there is an attack attempt on the message as a result of the analysis, and performing a digital signature/verification and encryption/decryption process on a transmitted/received message, an authentication server for performing user authentication by employing a SAML assertion included in the received message or which is newly issued and received from a SAML authority server when a SAML assertion is not included in the received message or which is obtained using a received SAML artifact if the SAML assertion is previously issued and the SAML artifact related to the SAML assertion is received instead of SAML assertion itself, an authorization server for authorizing access based on security policy by checking contents of the received message and attributes of the SAML assertion, a policy server that manages the security policy, and an application server for performing a web service on the web service request included in the received message.

Advantageous Effects

In accordance with the present invention, in Mashup services in which a variety of the third-party resources in different domains are combined and used as service constituent elements, harmful resources of the third-party resources can be intercepted and attack exploiting the characteristics of a web can be prevented. Further, the present invention can provide authentication, integrity, non-repudiation, confidentiality, and contents-based message filtering with respect to messages exchanged between web service apparatuses belonging to different domains, and enables security policy-based access control. In addition, the present invention can provide single sign-on to the Mashup services and can also be applied to web service security using not only XML-based message exchange, but also JSON and plain text based message exchange.

BEST MODE FOR CARRYING OUT THE INVENTION

Hereafter, the present invention will be described in detail with reference to the accompanying drawings.

Figure 1:
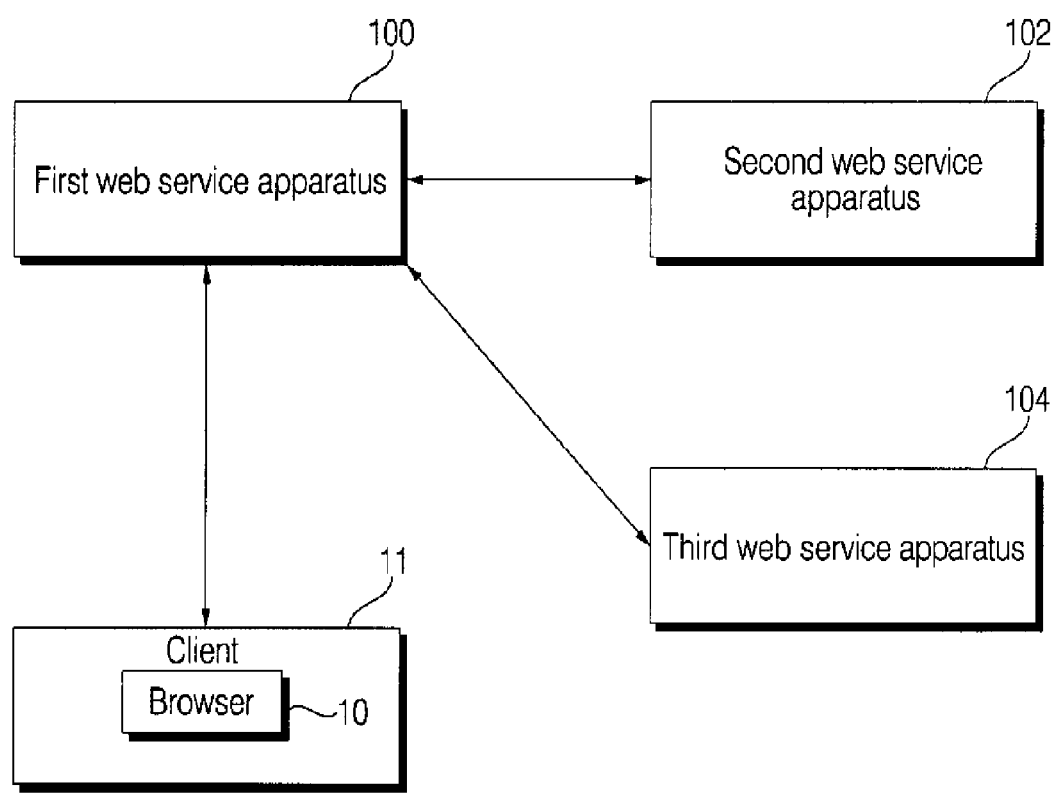
FIG. 1 is a block diagram showing a web service environment including a web service apparatus that provides a secure Mashup service in accordance with the present invention.

FIG. 1 is a block diagram showing a web service environment including a web service apparatus that provides a secure Mashup service in accordance with the present invention.

Referring to FIG. 1, a web service environment includes a browser 10 included in client 11 which requests web services and outputs web services response, and web service apparatuses 100, 102, and 104 that perform web services according to a request by the browser 10.

The client 11 uses an application service of the first web service apparatus 100, which belongs to the first domain, using the browser 10. The first web service apparatus 100 belonging to the first domain provides a Mashup service in which application services of the second and third web service apparatuses 102 and 103, belonging to second and third domains are combined. A security module included in the browser 10 operates in conjunction with an AJAX engine and performs security processing which employs Secure Socket Layer (SSL), WS-Security, etc, and harmful contents interception functions, and so on, with respect to these messages.

For Mashup, AJAX is generally used. Messages used by AJAX include XML, JSON, and general plain text. The security module included in the browser operates in conjunction with the AJAX engine and performs security processing which employs Secure Socket Layer (SSL), WS-Security, etc, and harmful contents interception functions, and so on, with respect to these messages.

A web security service existing in each domain provides authentication, integrity, non-repudiation, confidentiality, and contents-based message filtering with respect to messages, which are exchanged between the third-party services belonging to different domains in a Mashup service, and also provides security policy-based access control and single sign-on to a Mashup service using services between different domains.

Figure 2:
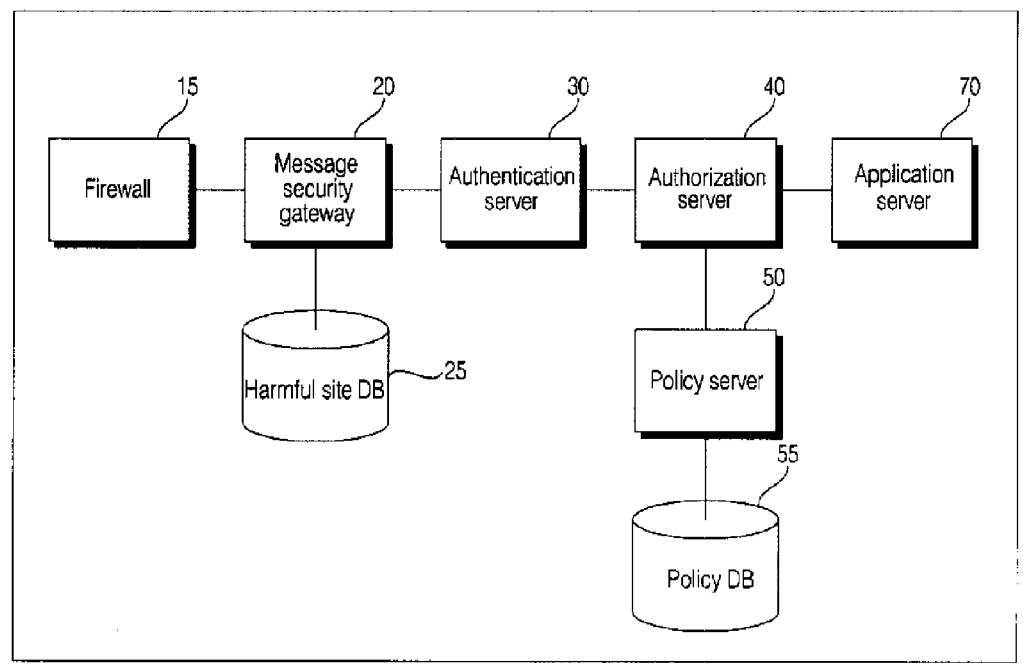
FIG. 2 is a block diagram showing an internal structure of a secure web service apparatus in accordance with an embodiment of the present invention.

FIG. 2 is a block diagram showing an internal structure of a secure web service apparatus in accordance with an embodiment of the present invention.

The web service apparatus 100 includes a harmful site database 25 that stores information about known harmful sites, a message security gateway 20 which rejects reception of a web service request message from any one of the harmful sites, precludes transmission of a web service request transmit message to any one of the harmful sites, analyzes the request message, and, when there is any attack attempt on the message as a result of the analysis, denies the reception of the message, an authentication server 30 that authenticates a user by employing Security Assertion Markup Language (SAML) assertion included in the received message or SAML assertion newly issued by a SAML authority server when a SAML assertion is not included in the received message, or obtaining the SAML assertion that has been previously issued using the received SAML artifact related to the SAML assertion, if any, and employing the obtained SAML assertion, an authorization server 40 that authorizes access based on security policy by checking the contents of the received message and the attributes of the SAML assertion, and an application server 70 that performs an application service in response to the received message. The web service apparatus 100 may further include a policy server 50 and a firewall 15.

The firewall 15 processes message security at a network level.

The message security gateway 20 is responsible for decryption and verification of a request message protected by SSL and WS-Security, and message protection of outgoing messages. After the decryption and verification of the request message, the message security gateway 20 analyzes the contents of the message in order to check whether there are XML-related attack, such as XML-DoS, XML message injection and manipulation, and web hacking and harmful scripts such as SQL injection.

The harmful site database 25 stores information about known harmful web sites. The message security gateway 20 precludes request messages from the sites, service requests to these sites, and the use of a Mashup service using these sites as constituent elements.

The authentication server 30 is responsible for user authentication within a single domain. Upon authentication, the authentication server 30 uses SAML assertion issued by a SAML authority server. The SAML authority server performs user ID management of a plurality of domains and an authentication function, and issues SAML assertion.

The authorization server 40 performs access control on a service request based on user attribute information received from the client 11 and the authentication server 30.

The policy server makes a policy decision on a service request, which is received by the authorization server 40, based on a security policy managed in a policy database (DB) 55.

The application server 70 is a place where a request message from the client is finally sent. The application server 70 performs application services and provides a Mashup service combined with the third-party services of different domains.

A message exchanged between the client and the server includes three forms such as Simple Object Access Protocol (SOAP), JavaScript Object Notation (JSON), and plain text. When a SOAP message is used, WS-Security is used for message protection and, when JSON and plain text are used, the SSL is used for message protection.

Figure 3:
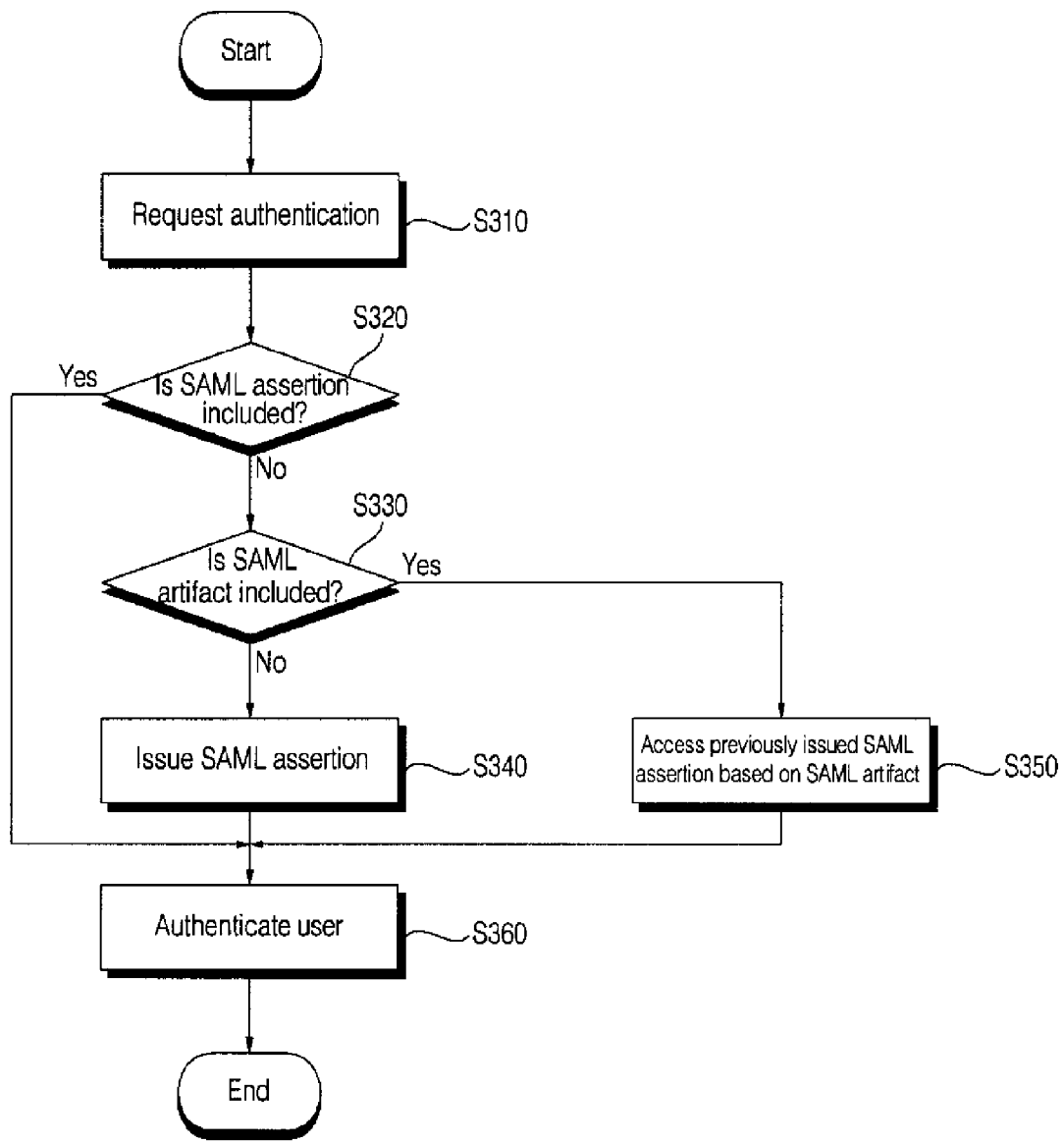
FIG. 3 is a flowchart showing a secure web service method in accordance with an embodiment of the present invention.

FIG. 3 is a flowchart showing a secure web service method in accordance with an embodiment of the present invention.

Referring to FIG. 3, the authentication server 30 receives an authentication request from the message security gateway 20 (S310).

The authentication server 30 determines whether SAML assertion is included in a web service request message (S320). If, as a result of the determination, the SAML assertion is included in the web service request message, the authentication server 30 performs user authentication by employing the SAML assertion (S360).

If, as a result of the determination, the SAML assertion is not included in the web service request message, the authentication server 30 determines whether a SAML artifact is included in the web service request message (S330). The SAML artifact can be used to find SAML assertion that has been previously issued in other servers.

If, as a result of the determination, the SAML artifact is included in the web service request message, the authentication server 30 obtains SAML assertion that has been previously issued from the SAML authority server by employing the SAML artifact (S350). In other words, the authentication server 30 transfers the SAML artifact to the SAML authority server. The SAML authority server finds corresponding SAML assertion, which has been previously issued, based on the received SAML artifact and transfers the found SAML assertion to the authentication server 30. The authentication server 30 authenticates users by employing the issued SAML assertion (S360).

If, as a result of the determinations, both the SAML assertion and the SAML artifact are not included in the web service request message, the authentication server 30 transfers authentication information to the SAML authority server, gets newly issued SAML assertion (S340), and authenticates users by employing the issued SAML assertion (S360).

Figure 4:
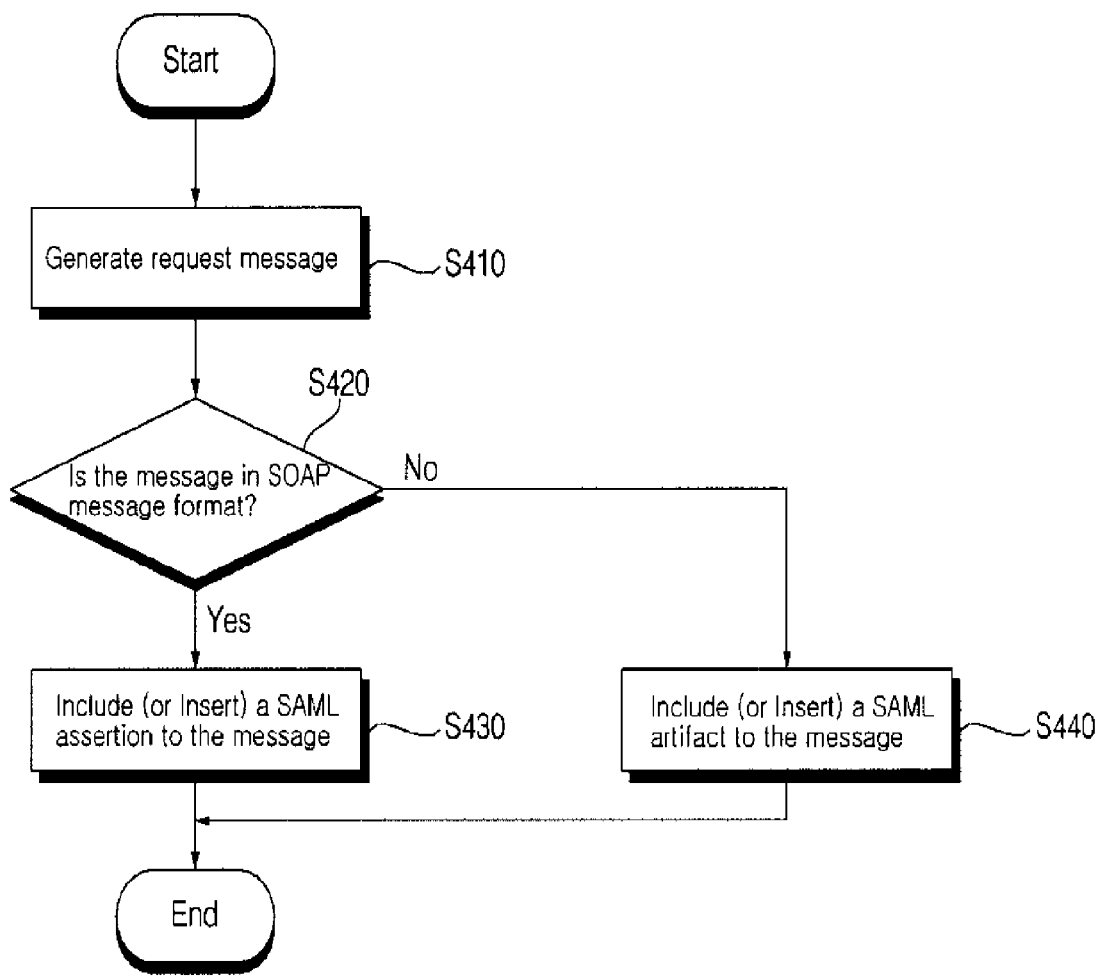
FIG. 4 is a flowchart showing a secure web service method in accordance with another embodiment of the present invention.

FIG. 4 is a flowchart showing a secure web service method in accordance with another embodiment of the present invention.

Referring to FIG. 4, in the case in which the application server 70 has to request services or resources of other domains while a service is performed, the application server 70 sends a web service request message to other web service apparatus. The application server 70 generates a request message to be sent to other apparatus (S410).

The application server 70 determines whether the format of a received request message is in SOAP message format (S420). If, as a result of the determination, the format of the received request message is in the SOAP message format, the application server 70 includes SAML assertion in the transmit message (S430). This is because, in the SOAP message format, SAML assertion can be included. If, as a result of the determination, the format of the received request message is not in the SOAP message format, the application server 70 includes a SAML artifact in the transmit message (S440). The SAML artifact can be used to obtain a SAML assertion, which has been previously issued by the SAML authority server, by reference to the SAML artifact as described above.

Figure 5:
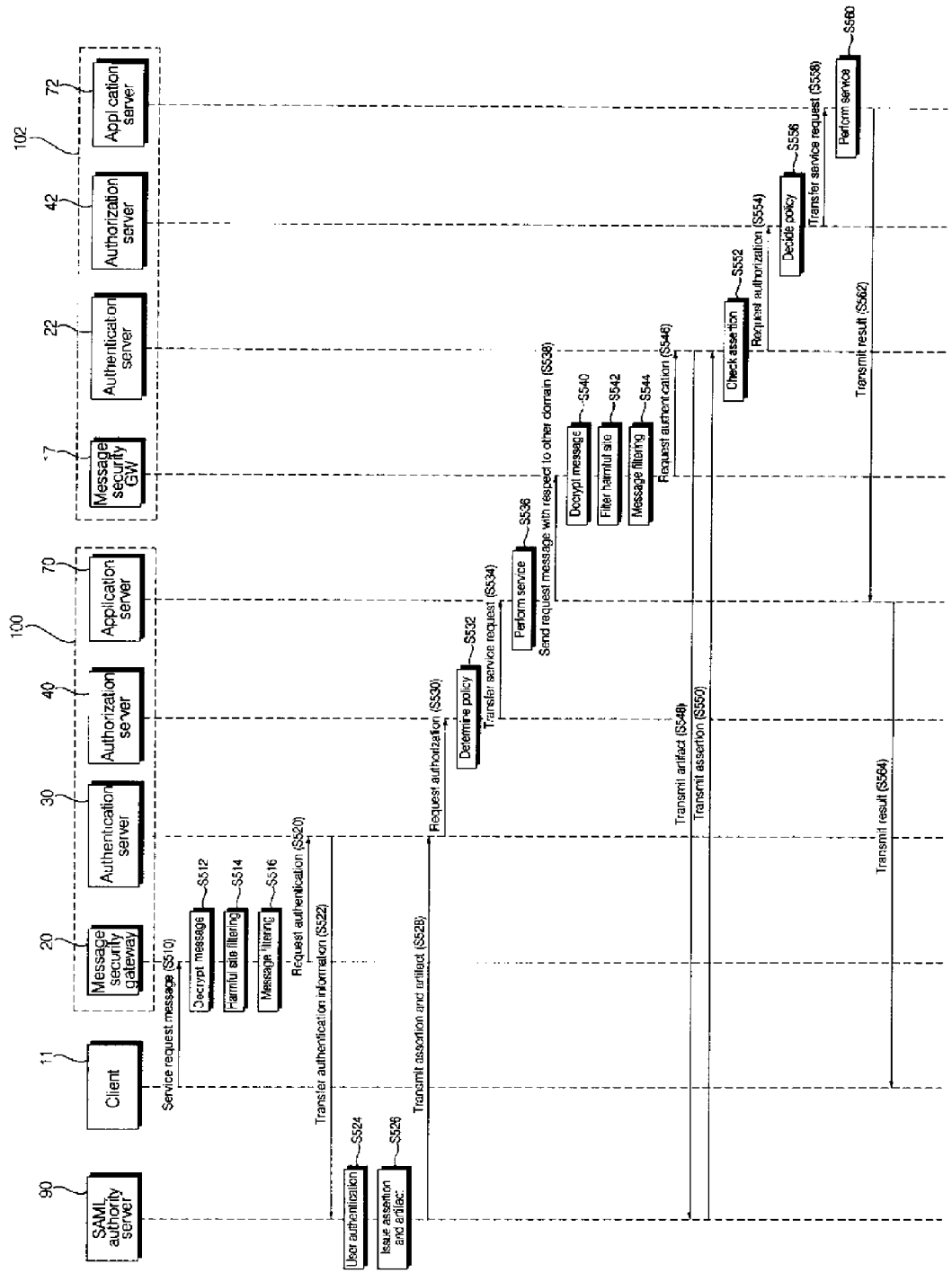
FIG. 5 is a message flowchart showing a secure web service method in accordance with an embodiment of the present invention.

FIG. 5 is a message flowchart showing a secure web service method in accordance with an embodiment of the present invention.

Referring to FIG. 5, the first web service apparatus 100 requests a service to the second web service apparatus 102. The present embodiment illustrates a security service process flow of a Mashup service using a message whose message format is not in SOAP format, such as JSON or plain text.

The client 11 sends a message requesting an application service to the first web service apparatus 100 (S510). Here, for the purpose of message protection, the message is secured using SSL.

The message security gateway 20 receives the request message from the web service apparatus 100 and decrypts the SSL-protected message (S512). If this request message has been received from a harmful site by reference to the harmful site database 25, the message security gateway 20 denies the request message (S514).

The message security gateway 20 analyzes a known web hacking attempt on a received message, such as SQL injection (S516) and sends an authentication request message to the authentication server 30 (S520).

The authentication server 30 transfers authentication-related information, such as a user id, a password, and a certificate, which is included in the request message, to the SAML authority server 90 (S522).

The SAML authority server 90 performs user authentication based on the received authentication information (S524). If this authentication is successful, the SAML authority server 90 issues a SAML assertion and a SAML artifact (S526).

The SAML artifact can be used to find a SAML assertion that has been previously issued in other servers. If a request message to other domains is not in SOAP or XML format, it is difficult to directly insert SAML assertion into the request message. Therefore, in the present embodiment, only a SAML artifact is transferred, and servers of other domains, which require an SAML assertion, receive the SAML artifact and access and use corresponding SAML assertion using the received SAML artifact.

The SAML authority server 90 transfers the issued SAML assertion and artifact to the authentication server 30 (S528). The authentication server 30 transfers user attributes which are included in the received SAML assertion, and the contents of the request message, to the authorization server 40 (S530).

The authorization server 40 requests the policy server to determine access control based on the contents of the request message and the attributes of the SAML assertion and determines whether to authorize access based on a security policy (S532).

If the access is authorized, the request message is transferred to the application server 70 of the first web service apparatus 100 (S534). The application server 70 performs the requested service (S536).

If the application server 70 has to request services or resources of other domains while the service is performed, the application server 70 sends a request message to other domains, which is protected by SSL (S538). At this time, the application server 70 sends the request message along with the SAML artifact issued from the SAML authority server 90 (S538). Incidentally, the application server 70 can check the harmful site database and, if the service in other domain that will be requested is classified as a harmful site as a result of the check, the request is cancelled. The protection process of the message can be performed directly by the application server 70 or the process can be delegated to the message security gateway 20.

A message security gateway 17 of the second web service apparatus 102 belonging to other domain receives the request message and decrypts the received request message (S540). The message security gateway 17 determines whether this request message has been received from a harmful site by reference to a harmful site database and, if, as a result of the determination, this request message has been received from the harmful site, rejects the request message (S542). The message security gateway 17 analyzes whether there is a known web hacking attempt on a received message, such as SQL injection (S544) and sends an authentication request message to an authentication server 22 (S546).

The authentication server 22 transfers the received SAML artifact in the request message to the SAML authority server 90 (S548).

The SAML authority server 90 finds a corresponding SAML assertion, which has been previously issued, based on the received SAML artifact and sends the corresponding SAML assertion to the authentication server 22 (S550).

The authentication server 22 checks the received SAML assertion in order to authenticate a user (S552), and transfers the attributes which are included in the SAML assertion, and the contents of the request message, to an authorization server 42 (S554).

The authorization server 42 requests the policy server to determine access control based on the contents of the request message and the attributes of the SAML assertion and decides whether to authorize access based on a security policy (S556).

If the access is authorized, the request message is transferred to the application server 72 of the second web service apparatus 102 (S558), and the application server 72 performs the requested service (S560).

The execution result of the application service is protected with SSL by the application server 72 or the message security gateway 17 and then sent to the first web service apparatus 100 (S562). The message security gateway 20 of the first web service apparatus 100 decrypts the execution result, verifies the decrypted message, protects the verified message using SSL, and then sends the message to the client 11 (S564). The client 11 decrypts the received message, verifies whether there is a harmful message in the received message, and then uses the message.

Figure 6:
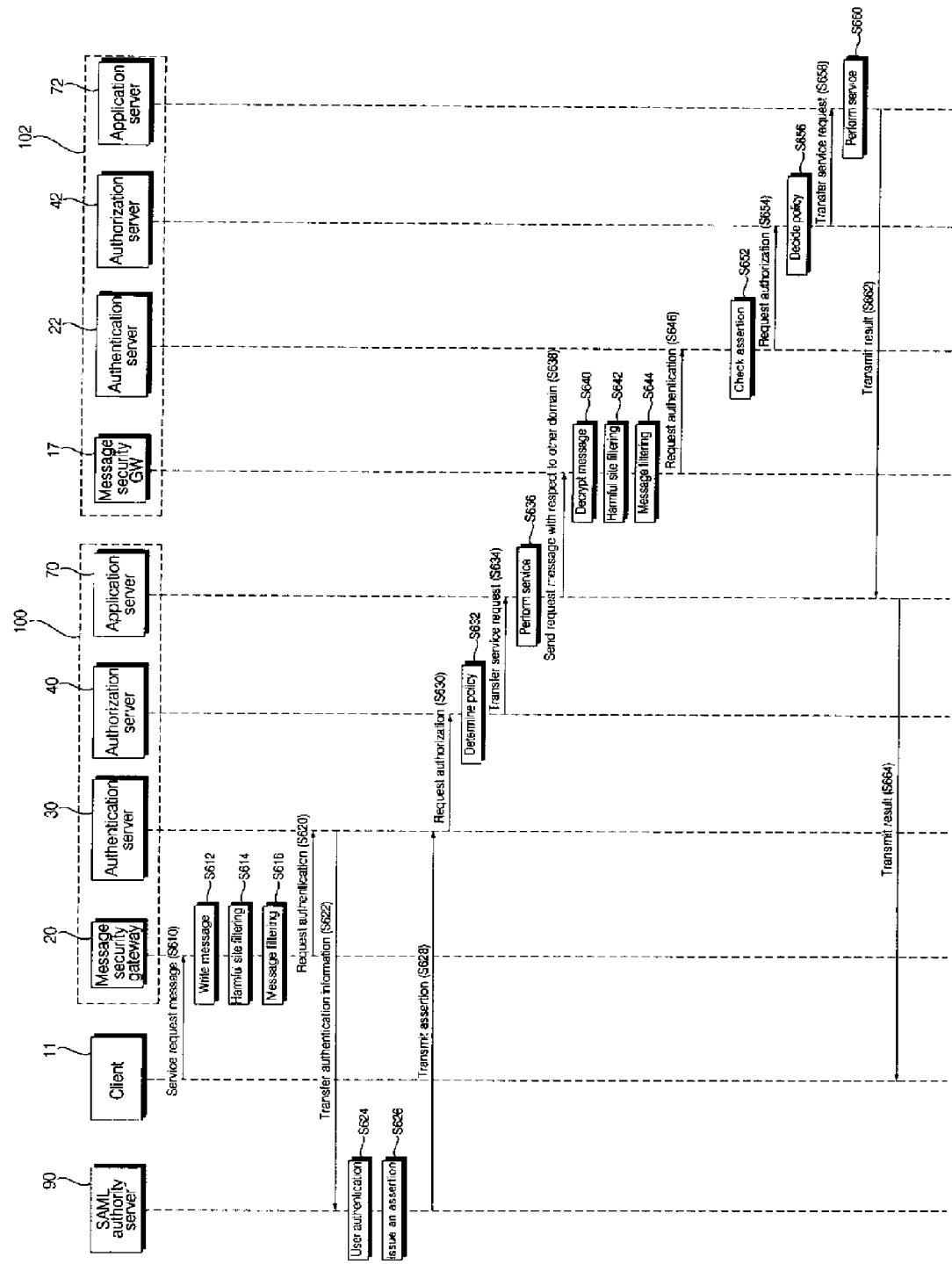
FIG. 6 is a message flowchart showing a secure web service method in accordance with another embodiment of the present invention.

FIG. 6 is a message flowchart showing a secure web service method in accordance with another embodiment of the present invention.

Referring to FIG. 6, the first web service apparatus 100 requests a service to the second web service apparatus 102. The present embodiment illustrates a security service process flow of a Mashup service using a message whose message format is in SOAP format.

The client 11 sends a request message to the first web service apparatus 100 (S610). Here, in order to protect the request message, the client 11 secures the message using WS-Security and sends it along with user authentication information such as a Username Token.

The message security gateway 20 receives the request message, decrypts the message protected by WS-Security, and performs digital signature verification (S612). If this request message has been received from a harmful site by searching the harmful site database for the harmful site, the message security gateway 20 rejects the request message (S614).

The message security gateway 20 performs schema verification on the received SOAP message, analyzes whether the message includes an XML message with vulnerability in order to analyze whether there has been an attack attempt on the message by exploiting the vulnerability of XML (S616), and then sends an authentication request message to the authentication server 30 (S620).

The authentication server 30 extracts authentication-related information, such as a user id, a password, and a certificate, from the security token included in the request message and transfers the extracted information to the SAML authority server 90 (S622).

The SAML authority server 90 performs user authentication based on the received authentication information (S624) and, if the authentication is successful, issues SAML assertion (S626).

The SAML authority server 90 transfers the issued SAML assertion to the authentication server 30 (S628). The authentication server 30 transfers user attributes which are included in the received SAML assertion, and the contents of the request message, to the authorization server 40 (S630).

The authorization server 40 requests the policy server to determine access control based on the contents of the request message and the attributes of the SAML assertion and determines whether to authorize access based on a security policy (S632).

If the access is authorized, the request message is transferred to the application server 70 (S634). The application server 70 performs the requested service (S636).

In the case in which other services or resources of other domains have to be requested while the service is performed, the application server 70 protects a request message to other domains using WS-Security and transmits the protected request message (S638). At this time, the application server 70 generates a SAML Token using the SAML assertion, which has been issued from the SAML authority server 90, and includes the SAML Token in the SOAP Header part of the request message. The application server 70 can search the harmful site database and, if the service in other domain that will be requested is classified as a harmful site, the request is cancelled. The protection process of the message can be performed directly by the application server 70 or the process can be delegated to the message security gateway 20.

The message security gateway 17 of the second web service apparatus 102 belonging to other domain receives the request message, decrypts the received request message, and performs digital signature verification (S640). The message security gateway 17 determines whether this request message has been received from a harmful site by searching the harmful site database for the harmful site and, if, as a result of the determination, this request message has been received from the harmful site, rejects the request message (S642). The message security gateway 17 performs schema verification on the received SOAP message, analyzes whether the message includes an XML message with vulnerability in order to analyze whether there has been an attack attempt on the message by exploiting the vulnerability of XML (S644), and then sends an authentication request message to the authentication server 22 (S646).

The authentication server 22 extracts the SAML assertion from the SAML Token included together in the request message, authenticates a user by checking the extracted SAML assertion, (S652), and transfers the attributes of the SAML assertion and the contents of the request message to the authorization server 42 (S654).

The authorization server 42 requests the policy server to determine access control based on the contents of the request message and the attributes of the SAML assertion and determines whether to authorize access based on a security policy (S656).

If the access is authorized, the request message is transferred to the application server 72 of the second web service apparatus 102 (S658). The application server 72 performs the requested service (S660).

The execution result of the application service is protected with WS-Security by the application server 72 or the message security gateway 17 and then sent to the first web service apparatus 100 (S662). The message security gateway 20 of the first web service apparatus 100 performs decryption and digital signature verification on the execution result, verifies the message, protects the message using WS-Security, and then sends the message to the client 11 (S664). The client 11 performs decryption and digital signature verification on the received message, verifies whether there is a harmful message in the received message, and then uses the message.

The present invention can be implemented as a computer-readable code in a computer-readable recording medium. The computer-readable recording medium can include all kinds of recording devices in which data readable by a computer system is stored. For example, the computer-readable recording medium can include ROM, RAM, CD-ROM, magnetic tapes, floppy disks, optical data storages, and so on, and can also be implemented in the form of carrier waves (for example, transmission over an Internet). Further, the computer-readable recording medium can be distributed into computer systems connected over a network, so a computer-readable code can be stored and executed in a distributed manner. A functional program, a code, and code segments for implementing the present invention can be easily deduced by programmers skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Industrial Applicability

In a web environment, a secure web service can be provided irrespective of the format of a web service request message, and single sign-on can be provided in a Mashup service using services between different domains.

The invention claimed is:

1. A web service method, comprising the steps of:
   receiving a web service request message by a web service apparatus directly from a client browser independent of a Security Assertion Markup Language (SAML) authority server;
   determining whether a SAML assertion is included in the received message;
   when, as a result of the determination, the SAML assertion is not included in the received web service request message, requesting SAML assertion issuance to the SAML authority and receiving the newly issued SAML assertion from the SAML authority server and performing user authentication; and
   when, as a result of the determination, the SAML assertion is included in the received web service request message, performing user authentication using the SAML assertion; and after the authentication is completed, performing a web service according to the received web service request message;
   when the web service request message has been received from one of harmful site addresses that have been previously stored in a harmful site database, rejecting the received message; and
   when, as a result of the determination, the SAML assertion is not included in the received web service request message, but a SAML artifact is included in the received web service request message, obtaining the SAML assertion that has been previously issued from the SAML authority server using the SAML artifact.

2. The web service method of claim 1, wherein, in the receiving step, when both the SAML assertion and the SAML artifact are not included in the received web service request message, authentication-related information included in the received web service request message is transferred to the SAML authority server in order to issue the SAML assertion.

3. The web service method of claim 1, further comprising the step of analyzing whether there is an attack attempt on the received message, and, when, as a result of the analysis, there is an attack attempt on the received message, denying the received message.

4. The web service method of claim 1, further comprising the step of determining whether to permit access based on security policy by checking contents of the received message and attributes of the SAML assertion.

5. The web service method of claim 1, further comprising the step of, when a request for a web service is made to another web service apparatus while the web service is performed, transmitting a web service request transmit message to the another web service apparatus.

6. The web service method of claim 5, wherein the web service transmit message includes a SAML artifact.

7. The web service method of claim 5, wherein, when the received message is in Simple Object Access Protocol (SOAP) message format, the web service transmit message includes a SAML assertion.

8. The web service method of claim 5, wherein, when the received web service request message is not in SOAP message format, the transmit message includes a SAML artifact.

9. The web service method of claim 5, further comprising the step of, when the address of the web service apparatus is identical to one of the harmful site addresses that have been previously stored in a harmful site database, precluding transmission of the transmit message.

10. The web service method of claim 1, further comprising when, as a result of the determination, the SAML assertion is not included in the received message:
    requesting SAML artifact issuance to the SAML authority;
    receiving the newly issued SAML artifact; and
    transmitting a web service request transmit message including the newly issued SAML artifact to another service apparatus.

11. The web service method of claim 10, wherein the another service apparatus is another web service apparatus in a different domain than the web service apparatus.

12. The web service method of claim 1, further comprising when, as a result of the determination, the SAML assertion is included in the received message:
    generating a SAML token using the SAML assertion; and
    transmitting a web service request transmit message including the SAML token to another service apparatus.

13. The web service method of claim 12, wherein the another service apparatus is another web service apparatus in a different domain than the web service apparatus.

14. A web service apparatus comprising:
    a harmful site database for storing information about known harmful sites;
    a message security gateway for rejecting reception of a web service request message from any one of the harmful sites and precluding transmission of the web service request message to any one of the harmful sites, analyzing the received web service request message, rejecting reception of the received web service request message when there is an attack attempt on the received web service request message as a result of the analysis, and performing a digital signature and encryption/decryption process on a transmitted/received web service request message, wherein the web service request message is received directly from a client browser independent of a SAML authority server;
    an authentication server comprising a processor and memory for performing user authentication including:
        employing SAML assertion included in the received web service request message;
        employing SAML assertion which is newly issued and received from a SAML authority server when a SAML assertion is not included in the received web service request message; and
        obtaining the SAML assertion that has been previously issued using the received SAML artifact related to the SAML assertion, if any, and employing the obtained SAML assertion;
    an authorization server comprising a processor and memory for authorizing access based on security policy by checking the contents of the received web service request message and the attributes of the SAML assertion; and an application server comprising a processor and memory for performing a web service on the web service request included in the received web service request message, wherein, when a SAML artifact is included in the received web service request message, the authentication server searches and receives the SAML assertion that has been previously issued from the SAML authority server using the SAML artifact.

15. The web service apparatus of claim 14, wherein, when a request for a web service is made to another application server, the application server transmits a transmit message to another application server.

16. The web service apparatus of claim 14, wherein the transmit message includes the SAML artifact.

* * * * *